United States Patent

Knüfelmann et al.

[15] 3,684,888
[45] Aug. 15, 1972

[54] DEVICE FOR MEASURING THE CROSS-SECTION OF WIRE AND THE LIKE

[72] Inventors: Manfred Knüflemann, Leverkusen-Schlebusch; Ingo Seidel, Cologn-Lindenthal, both of Germany

[73] Assignee: Gesellschaft fur Nuklearmerstechnik und Industrie-Elektronik M. Knufelmann & Co. mbH, Leverkusen-Schlebusch, Germany

[22] Filed: April 20, 1970

[21] Appl. No.: 30,193

[52] U.S. Cl. .............................. 250/83.3 D, 250/105
[51] Int. Cl. .......................... G01t 1/17, G01n 23/06
[58] Field of Search ......................... 250/83.3 D, 105

[56] References Cited

UNITED STATES PATENTS
3,066,562  12/1962  Barnett et al. .....250/83.3 D X
3,373,286  4/1968  Han ..........................250/105

*Primary Examiner*—James W. Lawrence
*Assistant Examiner*—Morton J. Frome
*Attorney*—Karl F. Ross

[57] ABSTRACT

To ascertain the uniformity of the cross-section of a wire or other elongated object, a beam of soft radiation emitted by a radioactive isotope such as $Am^{241}$ or $Sr^{90}$ is focused upon the longitudinally moving object as a beam bracketing that object with allowance for dimensional tolerances and minor deviations from straight-line motion. The unabsorbed beam energy beyond the object is intercepted by a detector and gives rise to an output signal varying with changes in the mass of the object per unit length. The signal may be fed back to a rolling mill or other apparatus to compensate for cross-sectional changes of the object continuously issuing therefrom.

4 Claims, 5 Drawing Figures

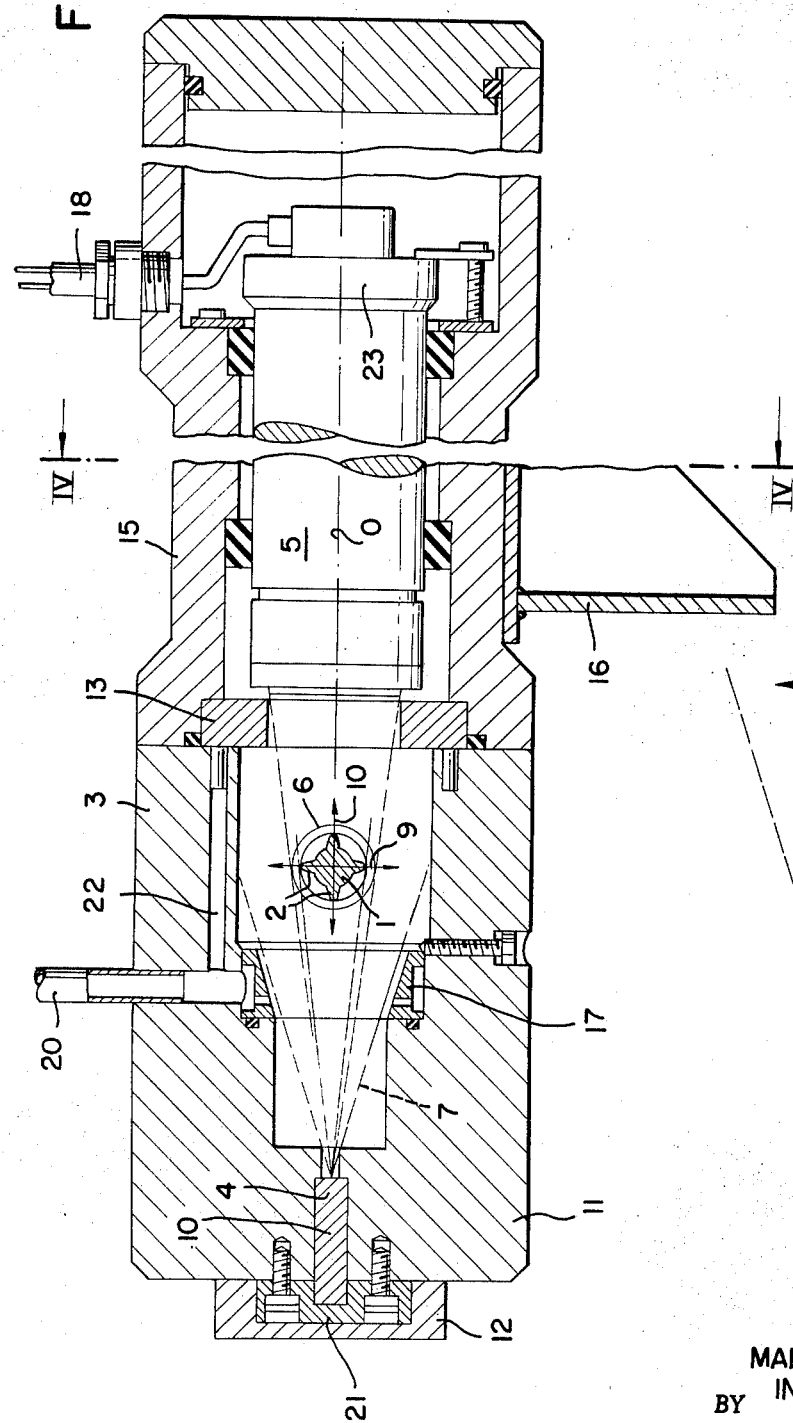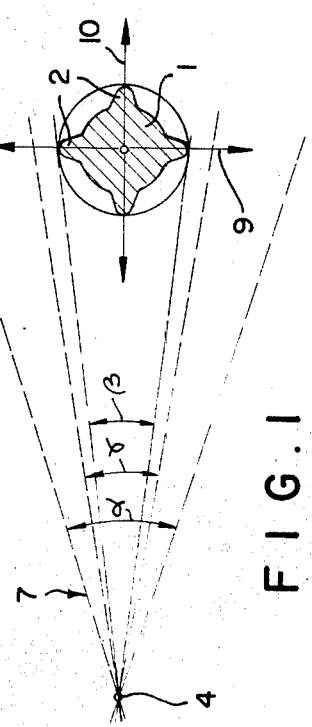

DEVICE FOR MEASURING THE CROSS-SECTION OF WIRE AND THE LIKE

FIELD OF THE INVENTION

Our present invention relates to a device for measuring the thickness of continuously moving elongated objects, such as wires of substantially uniform but not necessarily circular cross-section.

BACKGROUND OF THE INVENTION

For wire or rods of more or less intricate profile, such as the knurled, ribbed and twisted members used as reinforcing bars in concrete structures, conventional optical or mechanical measuring techniques are not practicable, when continuous monitoring is desired, because of the difficulty encountered in attempting to guide such objects past an observation point with negligible lateral motion. Such continuous monitoring is needed, for example, where the measuring device forms part of the feedback path of a control system charged with maintaining the cross-section constant, as in a rolling mill.

OBJECT OF THE INVENTION

The object of our present invention is to provide a method of and a device for reliably and expeditiously determining the mass per unit length of such objects as a measure of the uniformity of their cross-section.

SUMMARY OF THE INVENTION

Our invention utilizes the absorption of energy from a radioactive source, particularly an emitter of so-called "soft" radiation as a function of the mass of a given material traversing its field of emission. The extent of this absorption is defined by the specific cross-section for the irradiating particles and is well known for most solid materials.

In accordance with our invention, therefore, we train a beam of energy from a radioactive source upon the path of a linearly moving object to be measured, such as a strand of wire, the width of the beam being sufficient to bracket the object with allowance for dimensional tolerances and for minor deviations from a straight line of motion. The intensity of the radiant energy beyond the object, at a location centered on the beam axis, is monitored by a suitable detector. Variations in the incident energy at the monitor can be directly related to changes in the mass, and hence the cross-section, of the object intercepting the beam.

Since the absorption of radiated energy by the object is not materially affected by the motion or location of the object in the beam, the above measurement will not be sensitive to the motion of the object along its own axis or to lateral displacements of the object as long as such motion does not carry portions of the object outside the monitored beam.

It is, of course, preferable to minimize the allowance in beam width for such lateral motions, yet even large vibrations and displacements may be tolerated at the expense of some loss of sensitivity of the instrument.

The source of radiant energy should be matched to the absorbing characteristics of the material of the object in such manner that the greatest possible attenuation of the beam is observed. Emitters of alpha or low-energy beta particles, such as americium 241 and strontium 90, are preferred sources for the measurement of ferrous materials. Radioactive emitters, such as the isotopes named above, are preferred over active generators of penetrating radiant energy, such as X-ray machines, because of their inherent long-range stability.

Similarly, the detector used, e.g. a Geiger counter or a semiconductor, should be matched for greatest sensitivity to the type of radiant energy emitted by the source.

DESCRIPTION OF THE DRAWING

Our invention will now be further described with reference to the accompanying drawing in which:

FIG. 1 diagrammatically illustrates the principle of our invention;

FIG. 2 is a longitudinal sectioned view of an instrument embodying our invention;

SPECIFIC DESCRIPTION

Figure 3:
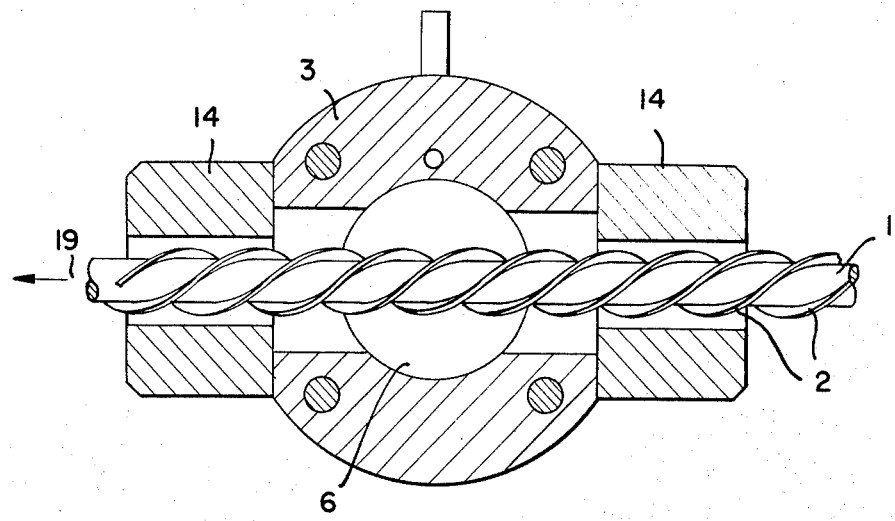
FIGS. 3 and 4 are transverse sections taken along lines III—III and IV—IV, respectively, of FIG. 2.

FIGS. 1 and 2 indicate a point source of radiation 4, of the type described above, shielded by a capsule 10 and an optical guide 17 (collimator) to emit a conical beam of radiant energy 7 with a limited vertex angle $\alpha$. A detector 5 is arranged coaxially with the radiated beam in such a manner that its sensitive aperture spans a lesser angle $\gamma$. The subject of the measurement, a deformed steel bar 1, is positioned to cast a shadow over an angle $\beta$ somewhat smaller than $\gamma$. The difference between the angles $\beta$ and $\gamma$ is the allowance for tolerances in the physical dimension of the bar 1 and for possible lateral shifts of the bar with respect to stationary guides 14 therefor, the guides 14 lie along the path of the bar with an axis orthogonal to the axis of the collimator and the beam. This allowance depends on the shape of the bar 1, the sensitivity of an associated dimensional control system described hereinafter with reference to FIG. 5, and the rate of advance of the bar 1.

The sensing angle $\gamma$ of detector 5 is established by a diaphragm 13 whose aperture may be circular or a longitudinal slit parallel to the axis of the bar 1. The detector 5 is located behind the diaphragm 13. The intensity of the incident radiation, integrated over the aperture area defined by the diaphragm 13, is transmitted to a controller 25 over a cable 18 by a transducer 23. Hence the diaphragm 13 has an aperture whose width corresponds to the shadow width of the object cast by the portion of the beam within angle $\gamma$ (which, as noted, is only slightly greater than $\beta$).

The capsule 10 containing the radioactive isotope is mounted in a base 11 of an instrument body 3. A radiation shield 12 prevents the escape of stray energy emitted by the source 4.

The bar 1, drawn through the guides 14 at right angles to the axis of the emitted beam 7, has its cross-section substantially bisected by the optical axis O of the instrument. The detector 5 is coaxially mounted in a housing 15 which also encloses the diaphragm 13.

Arrows 9 and 10 indicate possible deviations of the bar 1 from its assigned line of motion. This particular bar has a cylindrical central core with four interleaved helicoidal ribs 2 of long pitch and of a height equaling a fraction of the core diameter.

FIG. 3 further illustrates the manner in which the guides 14 are mounted on the central body 3 of the instrument for directing the bar 1 through its irradiation chamber 6.

Figure 4:
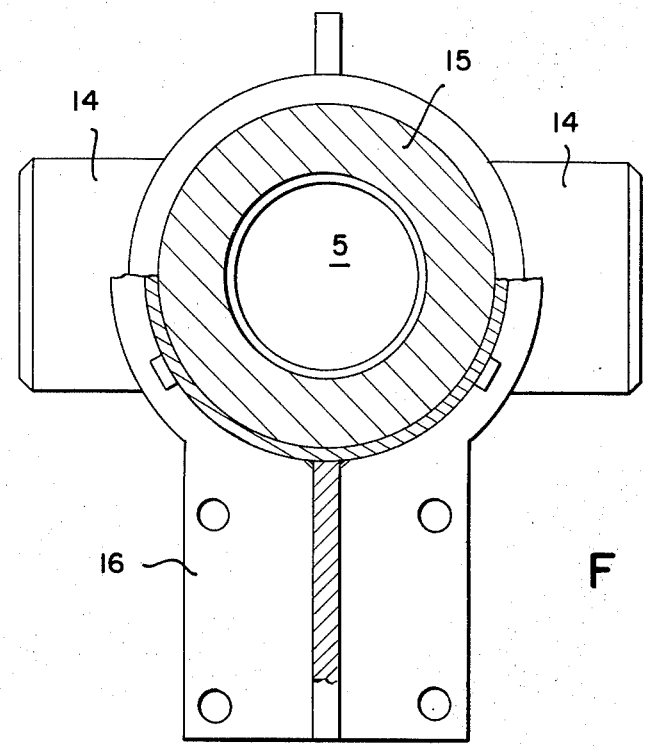

A mounting bracket 16 is affixed to the detector housing 15, as illustrated in the sectional view of FIG. 4.

Since the instrument is continuously heated by the emitted radiant energy, a cooling fluid is circulated through a conduit 20 and associated internal passages 22 of body 3. The accidental loss or removal of the radioactive source is prevented by the provision of a safety cap 21.

Figure 5:
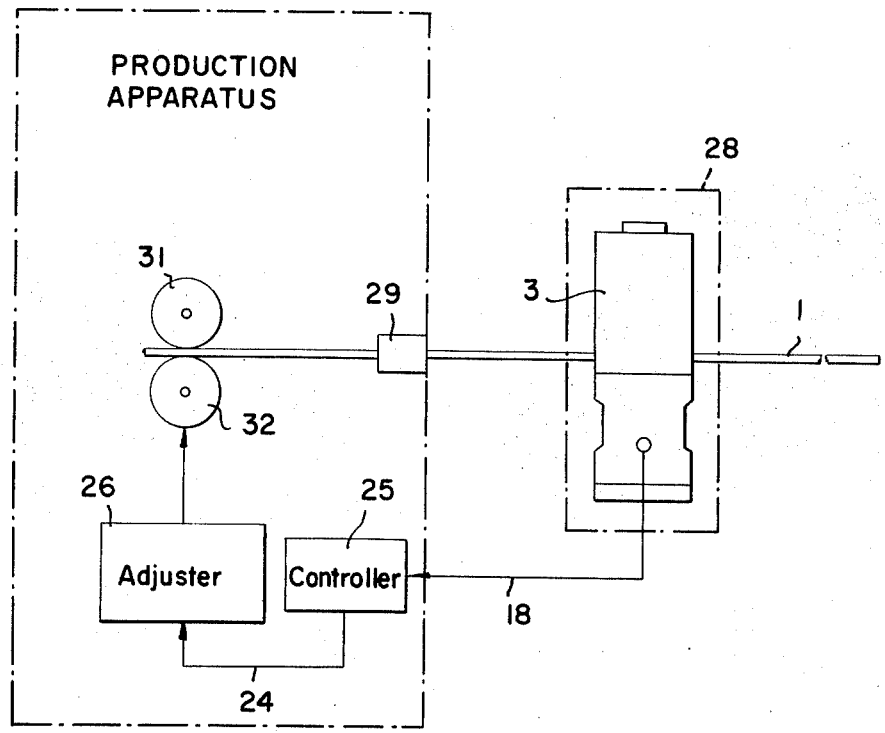
FIG. 5 is a diagrammatic representation of a control system including a measuring device according to our invention.

In FIG. 5 we have illustrated the use of our device in a testing station 28 located downstream of a plant 30, such as a rolling mill, continuously producing the test object 1. The energy incident upon detector 5 is translated by the transducer 23 into an electrical feedback signal from which the controller 25 derives a corrective command signal to compensate for fluctuations in cross-section. The command signal is transmitted via a line 24 to an adjuster 26 which varies the relative spacing of two rollers 31, 32 in the final deforming and drawing stage ahead of an outlet 29; these rollers may be suitably grooved to form, together with a similarly controlled second roller pair (not shown) in a transverse plane, the helicoidal webs 2 of the bar as is well known per se. It should be noted that the output of detector 5 is not significantly influenced by the geometry of these webs but varies only with the effective overall cross-sectional area of the bar.

We claim:

1. A device for ascertaining dimensional changes in an elongate object, comprising:
    a testing station including a substantially point source of constant radiant energy;
    a collimator at said station for directing said energy in the form of a diverging conical beam along an optical axis;
    guide means oriented along a transport axis generally orthogonal to said optical axis for directing a longitudinally moving object to be tested along said transport axis through said beam, the latter having an effective width sufficient to bracket said object with allowance for dimensional tolerances and minor deviations from straight-line motion;
    detector means sensitive to said radiation positioned along said optical axis beyond said guide means for intercepting and measuring residual radiant energy unabsorbed by said object; and
    diaphragm means between said source and said detector means for limiting the effective width of said beam, said diaphragm means having an aperture of a width corresponding to the shadow width of said object plus said allowance.

2. A device as defined in claim 1 wherein said source comprises a radioisotope.

3. A device as defined in claim 6, further comprising a common housing for said source, said guide means, said detector means and said diaphragm means.

4. In combination, a device as defined in claim 1 and an apparatus for continuously producing said object at an outlet thereof, said testing station being positioned downstream of said outlet, further comprising transducer means coupled to said detector means for converting variations of said residual radiant energy into a control signal fed back to said apparatus to compensate for cross-sectional changes of said object.

* * * * *

UNITED STATES PATENT OFFICE
CERTIFICATE OF CORRECTION

Patent No. 3,684,888      Dated 12 September 1972

Inventor(s) Manfred KNÜFELMANN et al.

It is certified that error appears in the above-identified patent and that said Letters Patent are hereby corrected as shown below:

In the heading, line [72] read:

-- Knüfelmann -- for "Knüflemann";

line [73] read the assignee as follows:

-- GESELLSCHAFT FÜR NUKLEARMESSTECHNIK UND INDUSTRIE-ELEKTRONIK M. KNÜFELMANN & CO. mbH

Signed and sealed this 13th day of February 1973.

(SEAL)
Attest:

EDWARD M. FLETCHER, JR.
Attesting Officer

ROBERT GOTTSCHALK
Commissioner of Patents